W. BARBER.
MOTOR VEHICLE.
APPLICATION FILED JULY 18, 1914.
1,153,537.
Patented Sept. 14, 1915.
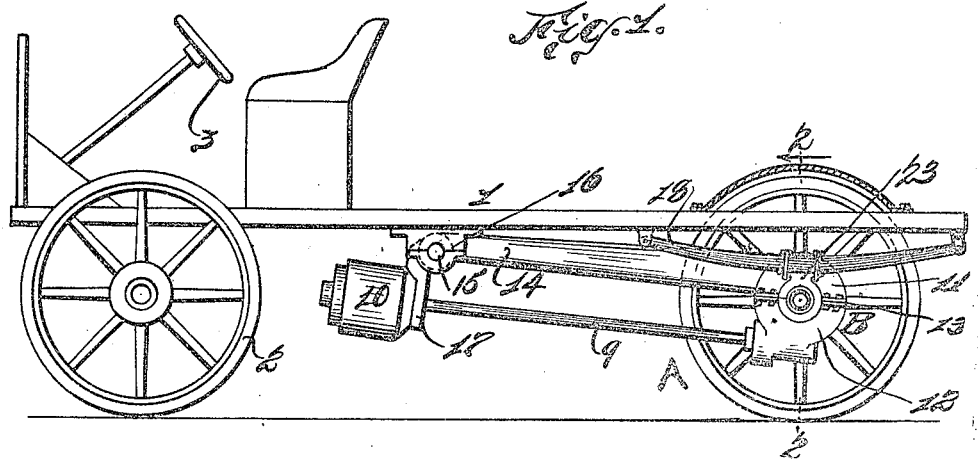
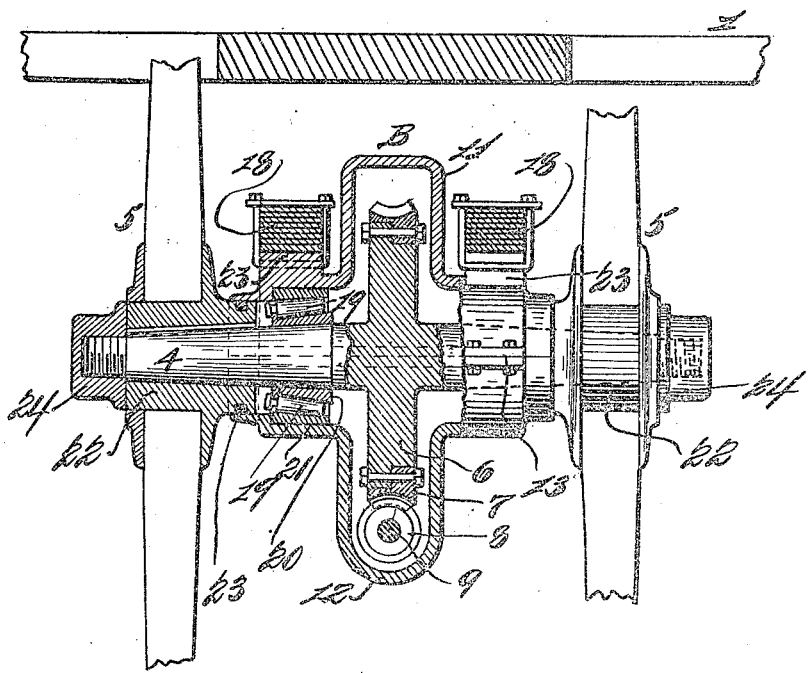
Witnesses
C. A. Jarvis
Robert Rieltter
Inventor:
William Barber.
F. Warry Wright
attorney.

UNITED STATES PATENT OFFICE.

WILLIAM BARBER, OF BROOKLYN, NEW YORK.

MOTOR-VEHICLE.

1,153,537.

Specification of Letters Patent. Patented Sept. 14, 1915.

Application filed July 18, 1914. Serial No. 851,685.

*To all whom it may concern:*

Be it known that I, WILLIAM BARBER, a citizen of the United States, residing at Brooklyn, in the county of Kings, city and State of New York, have invented certain new and useful Improvements in Motor-Vehicles, of which the following is a clear, full, and exact description.

This invention relates to an improvement in motor vehicles, but more particularly to the rear axle construction and wheels carried thereby, together with the means for driving same.

The object of this invention is to arrange the rear wheels in a manner to obviate the necessity of using a differential gearing.

By constructing a motor vehicle without a differential a great reduction of cost is effected to say nothing of the elimination of a great source of trouble in the operation of the vehicle.

To carry out my improvement I utilize a solid one-piece rear axle provided with a driving mechanism, the said rear axle having attached thereto, at its outer ends, the traction wheels of the vehicle. To eliminate the differential I place the traction wheels as close as possible to the driving mechanism therefor; for that reason the difference in rotation of the wheels, when the vehicle is turning a corner, is reduced to a minimum; other features of improvement will hereinafter appear.

In the drawings, forming part of this specification: Figure 1 is a side view of a motor vehicle embodying my improvement. Fig. 2 is an enlarged cross-sectional view thereof, the section being taken on a line 2—2 in Fig. 1, the wheels being broken off.

In the drawing, a motor vehicle body is indicated by 1, the said body being provided, at its forward end, with normal gage steering wheels 2, one only being shown, and a suitable steering mechanism including a steering wheel 3, details of the steering gear being omitted.

My invention consists chiefly of the rear axle construction, consisting of the rear axle proper indicated by 4, and the traction wheels 5. As can be seen in Fig. 2, the rear axle 4 is made in one piece and has integral therewith a disk 6 carrying a worm gear 7 having in mesh therewith a worm 8 carried by a driving shaft 9, which in turn is rotated by a motor 10. As can be seen, the rear axle housing, indicated by B, is made in two parts 11 and 12, secured together at 13. The lower half 12 incases the worm 9 while the upper half 11 carries an arm 14 journaled at 15 in a bearing 16 carried by the body of the vehicle. The arm 14 carries a bracket 17, to which the motor 10 is attached. It will be apparent from the above description and inspection of Fig. 1, that the motor will move or swing, when the body moves up and down upon the springs 18. For this reason I am able to dispense with the usual universal joints for the driving shaft connecting the motor and rear axle.

As will be seen in Fig. 2, the springs 18 are seated upon the upper half 11 of the housing B, and are located between the wheels 5 and cylindrical portion of the housing; hence the wheels 5 can be taken off without disassembling the vehicle. The springs 18 are located above, or in line with, the roller bearings 19 located between the cones 20 and 21.

In order to make the structure compact and to locate the wheels 5 as close together as possible, and yet maintain rigidity, I arrange the housing B so as to receive a portion of the hubs 22 of the wheels as shown in Fig. 2. The bearings 19 however take all the weight but the insertion of the inner end of each hub 22 in the outer ends of the housing makes a dust-proof arrangement, especially with the provision of gaskets 23. If the wheels 5 are large, they can protrude through the body as shown. The seats 22' for the springs 18 are preferably made integral with the upper half of the housing B. The wheels 5 are held upon the axle 4 by nuts 24. It will be apparent that the wheels 5 can be removed from the axle either separately or together, without disturbing the rest of the mechanism after the body is jacked up. If small wheels are used the body need not be jacked up. The arm 14 not only acts as a support for the motor, but it also acts as a thrust or truss bar connecting the rear axle housing and the body of the vehicle.

I claim as my invention:

1. In a motor vehicle, a body, front steering wheels carried thereby, rear traction wheels also carried by said body, an axle therefor, a housing for said axle operating mechanism within said housing for rotating said axle, an arm secured to said housing and extending toward the front end of the body, a pivotal support for the front end of said arm carried by said body said arm having a depending part at its front end, a motor carried by the depending part of said arm, and a shaft connecting said motor and said rear axle driving mechanism.

2. A rear axle assembly for motor vehicles, consisting of a housing, a one-piece rear axle carried thereby, said axle being shorter than the transverse width of the vehicle body, a worm gear carried by said axle, a worm to rotate said gear, wheel hubs secured to said axle, the inner end of each hub extending into the adjacent outer ends of said housing, wheels secured to said hubs, anti-friction bearings for said axle within said housing, springs carried by said housing and located in line with said bearings, and means to rotate said worm.

3. In a motor vehicle, a body, front steering and rear traction wheels therefor, an axle of shorter length than the transverse width of the body, and upon the ends of which said traction wheels are mounted whereby said traction wheels are brought into close relationship to each other, a single drive gear directly mounted on the axle between said traction wheels, a housing for said axle and drive gear, and means extending into said housing to actuate said drive gear.

4. In a motor vehicle, a body, front steering and rear traction wheels therefor, an axle of shorter length than the transverse width of the body and upon the ends of which said traction wheels are mounted, whereby said traction wheels are brought into close relationship to each other, a single drive gear directly mounted on the axle between said traction wheels, means engaging said drive gear to rotate said axle, and body supporting springs carried by said axle.

5. In a motor vehicle, a body, front steering and rear traction wheels therefor, an axle of shorter length than the transverse width of the body and upon the ends of which said traction wheels are mounted, whereby said traction wheels are brought into close relationship to each other, a single drive gear directly mounted on said axle between said traction wheels, a housing for said axle and drive gear, means extending into the housing to actuate said drive gear, and springs carried by said housing for supporting the vehicle body.

6. In a motor vehicle, a body, front steering and rear traction wheels therefor, an axle upon the ends of which said traction wheels are mounted, said axle being of shorter length than the transverse width of the vehicle body, whereby said traction wheels are brought into close relationship to each other, an arm journaled upon said axle and extending toward the front end of the vehicle body, a support over which the front end of said arm engages, said front end having a downward extension, a motor carried by said extension, and means actuated by said motor to drive said axle.

7. In a motor vehicle, a body, front steering and rear traction wheels therefor, an axle upon the ends of which said traction wheels are mounted, said axle being of shorter length than the transverse width of the body, a single drive gear mounted directly on the axle between said traction wheels, a housing for said gear, said traction wheels having hubs arranged to extend into the open ends of said housing, and forming a pivotal bearing for said housing, an arm carried by said housing, said arm being pivotally connected to the vehicle body, a motor carried by said arm, and means extending into said housing and actuated by said motor, to drive said axle.

8. A vehicle body having front steering wheels of normal gage, in combination with a rear axle, traction wheels mounted thereon in closely adjacent relation to each other for independent removal therefrom, a single drive gear for the axle located between said traction wheels, a housing for said drive gear, said housing being journaled on the hubs of said traction wheels, a motor support connected to the housing, a motor carried thereby, and means actuated by the motor to drive said gear.

9. In a motor vehicle, a body having front steering and rear traction wheels, said front steering wheels being of normal gage, an axle of shorter length than the transverse width of the body, said rear traction wheels being independently mounted upon the respective ends of said axle and in close or narrow gage relationship to each other, for independent removal, a single drive gear directly mounted on said axle between said traction wheels for driving said axle, and means to actuate said drive gear.

Signed at New York city, New York, this 17th day of July, 1914.

WILLIAM BARBER.

Witnesses:
MABEL DITTENHOEFER,
ROBERT RICHTER.